(12) United States Patent
Tracht et al.

(10) Patent No.: US 7,195,277 B2
(45) Date of Patent: Mar. 27, 2007

(54) VEHICLE SEAT ASSEMBLY

(75) Inventors: Michael L. Tracht, Ingolstadt (DE); Rainer Penzel, Munich (DE)

(73) Assignee: Lear Corporation, Southfield, MI (US)

( * ) Notice: Subject to any disclaimer, the term of this patent is extended or adjusted under 35 U.S.C. 154(b) by 210 days.

(21) Appl. No.: 10/904,830

(22) Filed: Dec. 1, 2004

(65) Prior Publication Data

US 2006/0113759 A1 Jun. 1, 2006

(51) Int. Cl.
*B60R 21/207* (2006.01)
(52) U.S. Cl. .................. 280/730.2; 297/218.5
(58) Field of Classification Search ............ 280/730.2; 297/218.1–218.5, 440.11
See application file for complete search history.

(56) References Cited

U.S. PATENT DOCUMENTS

| | | | | |
|---|---|---|---|---|
| 3,928,898 A | * | 12/1975 | Smoot | 297/218.1 |
| 4,881,301 A | * | 11/1989 | Sweeney et al. | 24/30.5 R |
| 5,382,083 A | | 1/1995 | Fecteau et al. | |
| 5,401,075 A | * | 3/1995 | Venuto et al. | 297/218.2 |
| 5,478,134 A | | 12/1995 | Bernard et al. | |
| 5,498,030 A | | 3/1996 | Hill et al. | |
| 5,503,454 A | * | 4/1996 | Sakamoto | 297/218.1 |
| 5,678,853 A | | 10/1997 | Maly | |
| 5,749,597 A | | 5/1998 | Saderholm | |
| 5,762,363 A | | 6/1998 | Brown et al. | |
| 5,799,970 A | * | 9/1998 | Enders | 280/730.2 |
| 5,816,610 A | | 10/1998 | Higashiura et al. | |
| 5,860,673 A | | 1/1999 | Hasegawa et al. | |
| 5,863,063 A | | 1/1999 | Harrell | |
| 5,879,051 A | * | 3/1999 | Cozzani | 297/218.3 |
| 5,927,749 A | | 7/1999 | Homier et al. | |
| 5,937,488 A | * | 8/1999 | Geiger | 24/339 |
| 5,938,232 A | | 8/1999 | Kalandek et al. | |
| 5,967,603 A | | 10/1999 | Genders et al. | |
| 6,045,151 A | | 4/2000 | Wu | |
| 6,095,602 A | * | 8/2000 | Umezawa et al. | 297/216.1 |
| 6,155,593 A | * | 12/2000 | Kimura et al. | 280/728.2 |
| 6,237,934 B1 | | 5/2001 | Harrell et al. | |
| 6,439,598 B1 | * | 8/2002 | Braun et al. | 280/728.2 |
| 6,588,838 B1 | | 7/2003 | Dick, Jr. et al. | |
| 7,073,693 B2 | * | 7/2006 | Law | 223/50 |
| 2002/0024198 A1 | * | 2/2002 | Umezawa et al. | 280/728.2 |
| 2003/0178822 A1 | * | 9/2003 | Yamamura et al. | 280/730.2 |
| 2006/0131848 A1 | * | 6/2006 | Miyake et al. | 280/730.2 |

FOREIGN PATENT DOCUMENTS

| | | |
|---|---|---|
| DE | 37 32 836 C1 | 12/1988 |
| DE | 43 13 813 A1 | 11/1994 |
| DE | 697 05 528 T2 | 5/2002 |

(Continued)

OTHER PUBLICATIONS

U.S. Appl. No. 08/808,572, filed Feb. 28, 1997, Wu et al.

*Primary Examiner*—Paul N. Dickson
*Assistant Examiner*—Leonard McCreary, Jr.
(74) *Attorney, Agent, or Firm*—Brooks Kushman P.C.

(57) ABSTRACT

A vehicle seat assembly including a frame, an air bag module, and a trim cover having an end portion. A first coupling member is disposed proximate the end portion. A second coupling member is adapted to engage the first coupling member. The second coupling member is received in a slot defined by the air bag module and the frame.

20 Claims, 4 Drawing Sheets

FOREIGN PATENT DOCUMENTS

| | | |
|---|---|---|
| DE | 202 01 439 U1 | 6/2002 |
| DE | 101 20 118 A1 | 11/2002 |
| EP | 0 345 848 | 12/1989 |
| EP | 0 990 554 A1 | 4/2000 |
| FR | 2 686 553 | 7/1993 |
| JP | 11-342278 | 12/1999 |

* cited by examiner

VEHICLE SEAT ASSEMBLY

BACKGROUND OF THE INVENTION

1. Field of the Invention

The present invention relates to a vehicle seat assembly, and more particularly to a seat assembly having a coupling member for securing a trim cover.

2. Background Art

Vehicle seat assemblies may include a trim cover disposed on a foam cushion. Previously, trim covers were attached to the foam cushion by stitching, adhesives, or staples. Such permanent attachment methods made removal, repositioning, and replacement of a trim cover impractical.

SUMMARY OF THE INVENTION

According to one aspect of the present invention, a vehicle seat assembly is provided. The vehicle seat assembly includes a cushion assembly, a first coupling member, a second coupling member, and an air bag module. The cushion assembly has a frame, a cushion associated with the frame, and a trim cover disposed proximate the cushion. The trim cover has an end portion. The first coupling member is disposed proximate the end portion. The second coupling member is adapted to engage the first coupling member. The air bag module is disposed proximate the frame. The air bag module and the frame cooperate to define a slot adapted to receive a second coupling member.

The first and second coupling members may have male or female configurations. The first coupling member may have one or more protrusions adapted to engage the second coupling member. The second coupling member may have one or more protrusions adapted to engage the first coupling member.

According to another aspect of the present invention, a vehicle seat assembly is provided. The vehicle seat assembly includes a cushion assembly, an air bag module, and first and second coupling members. The cushion assembly has a frame, a cushion disposed proximate the frame, and a trim cover disposed proximate the cushion. The trim cover includes an end portion. The first coupling member is attached to the end portion. The air bag module is disposed proximate the frame and cooperates with the frame to define a first slot. The second coupling member includes a first arm disposed in the first slot. The second coupling member is configured to engage the first coupling member to secure the trim cover to the air bag module.

The second coupling member may include second and third arms. The second and third arms may cooperate to define a second slot that receives the first coupling member. The third arm may include a curved end portion that extends away from the second arm. The curved end portion may contact the trim cover when the first and second coupling members are engaged. The second arm may be disposed adjacent to the air bag module. The third arm may be spaced apart from the air bag module. The third arm may be longer than the second arm.

The first coupling member may include one or more protrusions adapted to engage the second and/or third arms. The second and/or third arms may include one or more apertures adapted to receive one or more protrusions.

The first coupling member may include an end surface and a protrusion disposed proximate the end surface. The second coupling member may include an aperture disposed in the first arm that is adapted to receive the protrusion.

The second coupling member may include a reinforcement rib disposed proximate the first arm. The reinforcement rib may have a first surface that engages the frame when the first arm is fully inserted into the first slot.

According to another aspect of the present invention, a vehicle seat assembly is provided. The vehicle seat assembly includes a seat back, an air bag module, a first coupling member, and a second coupling member. The seat back has a frame, a cushion connected to the frame, and a trim cover disposed proximate the cushion. The trim cover has an end portion. The first coupling member is attached to the end portion. The air bag module is disposed proximate the frame. The air bag module and the frame cooperate to define a first slot. The second coupling member has a first arm disposed proximate the first slot and second and third arms that cooperate to define a second slot. The first coupling member is at least partially disposed in the second slot when the first and second coupling members are engaged.

The air bag module may include an air bag disposed at least partially in an air bag housing and an inflator configured to supply inflation gas to the air bag to facilitate air bag deployment. The second coupling member may inhibit the air bag from compressing the cushion when the air bag is inflated. The second and third arms may be configured to flex toward the cushion when the air bag is inflated.

DETAILED DESCRIPTION OF THE EMBODIMENT(S)

Figure 1:
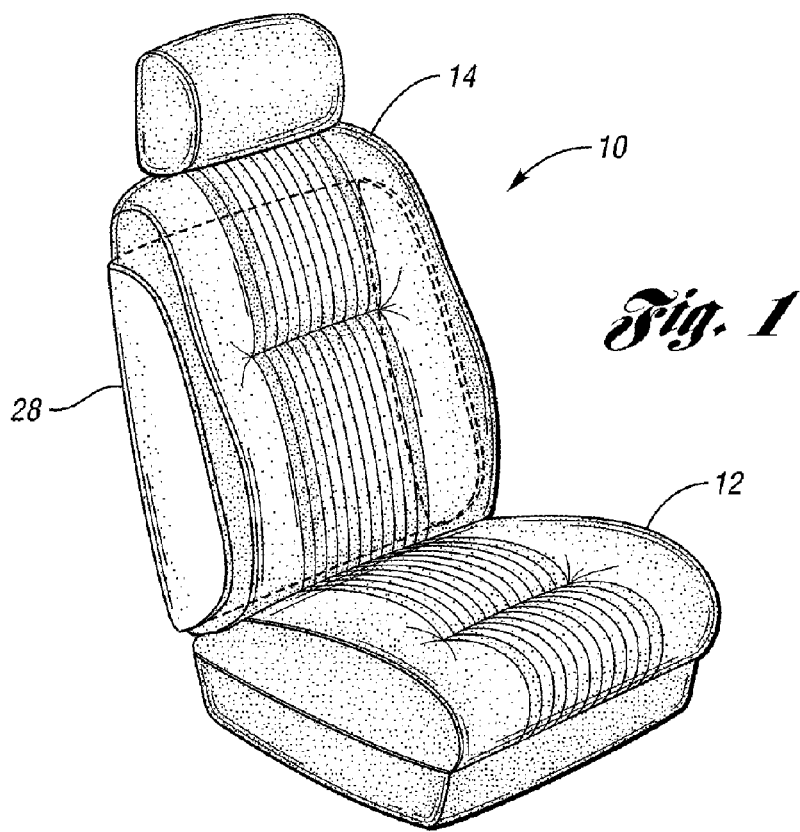
FIG. 1 is a perspective view of a vehicle seat assembly.

Referring to FIG. 1, a seat assembly 10 for a motor vehicle is shown. The seat assembly includes a seat bottom 12 and a seat back 14. The seat bottom 12 is adapted to be mounted on the vehicle. The seat back 14 is disposed proximate the seat bottom 12 and may be adapted to pivot with respect to the seat bottom 12.

Figure 2:
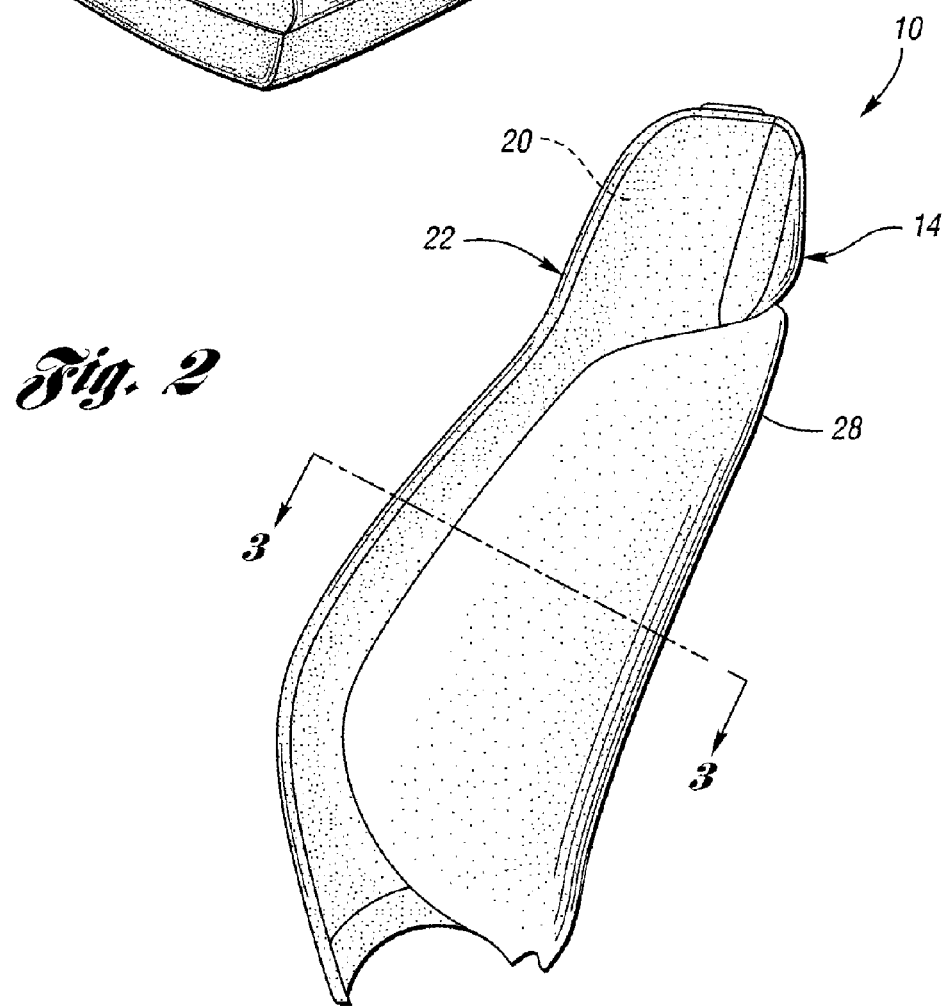
FIG. 2 is a side view of a portion of the vehicle seat assembly.
Figure 3:
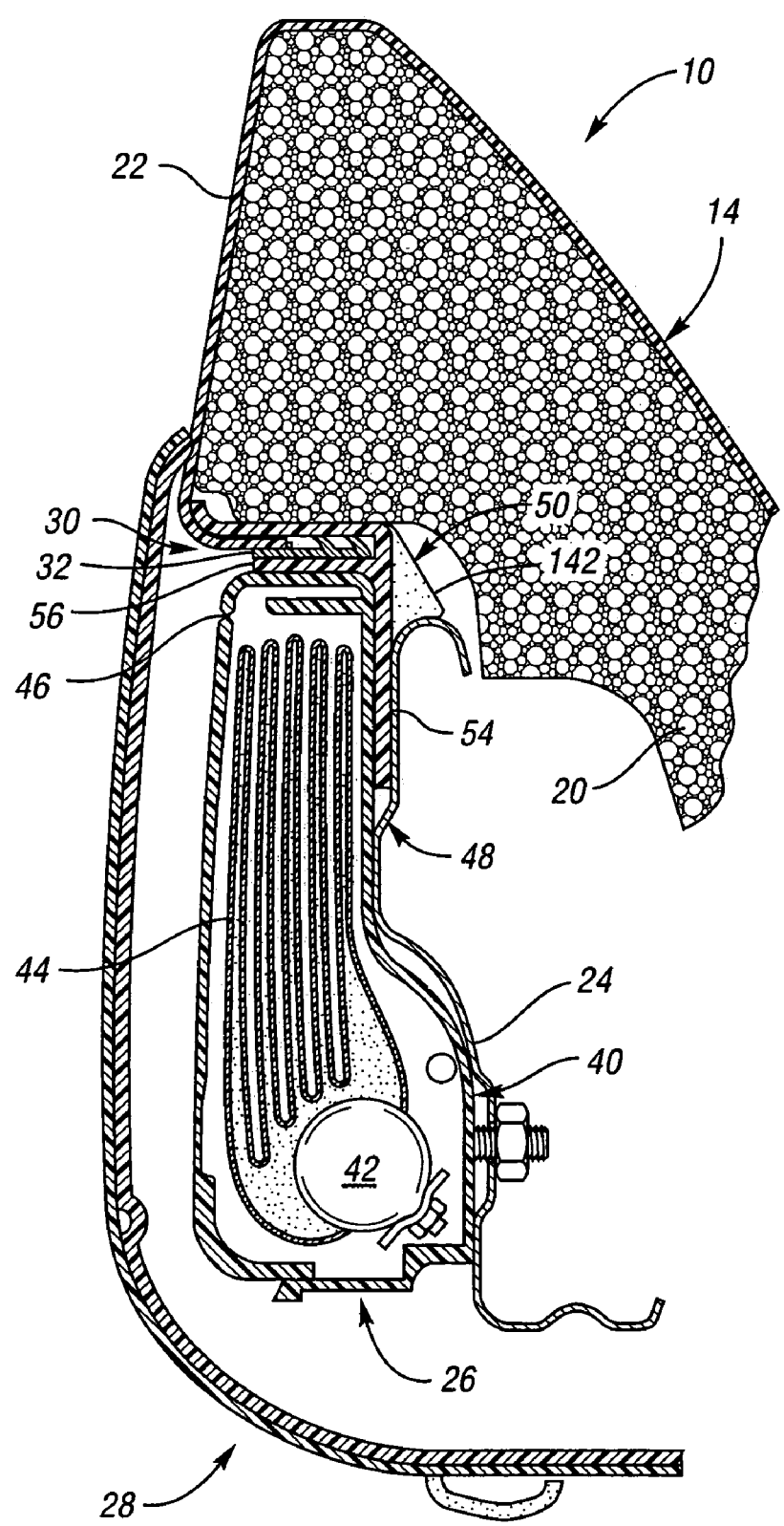
FIG. 3 is a fragmentary section view of an embodiment of the vehicle seat assembly taken through line 3—3.

Referring to FIGS. 2 and 3, the seat back 14 is shown in more detail. In the embodiment shown, the seat back 14 includes a seat pad or cushion 20, a trim cover 22, a frame 24, an air bag module 26, and a back panel 28.

The cushion 20 may have any suitable configuration and may be made of any suitable material, such as molded polymeric material like polyurethane foam. In the embodiment shown, the cushion 20 is disposed proximate the frame 24 and may be attached to the frame 24 at various locations.

The trim cover 22 is configured to form an exterior surface of the seat assembly 10. The trim cover 22 may be made of any suitable material, such as fabric, vinyl, and/or leather. The trim cover may be disposed proximate one or more surfaces of the cushion 20. In addition, the trim cover 22 may be attached to the cushion 20 in any suitable manner, such as with an adhesive, stitching, or fastener. In the embodiment shown, the trim cover 22 includes an end portion 30 that is detached from the cushion 20.

A first coupling member 32 is disposed proximate the end portion 30. The first coupling member 32 may be attached to the end portion 30 in any suitable manner, such as with a fastener, adhesive, sonic or ultrasonic welding, or heat staking. The first coupling member 32 may have any suitable configuration. For example, the first coupling member 32 may have a male or a female configuration, or combinations thereof. The first coupling member 32 is configured to facilitate attachment of the trim cover 22 to the seat assembly 10 as will be described in greater detail below.

The first coupling member 32 may be made of any suitable material or materials, such as a metal or a polymeric material like polypropylene. In addition, the first coupling member 32 may include one or more protrusions 34 that extend from one or more surfaces of the first coupling member 32. The body and protrusions of the first coupling member 32 may be made of different materials. For example, the first coupling member 32 may include a metal body and polymeric protrusions or vice versa. In addition, a plurality of first coupling members 32 may be employed.

The frame 24 may have any suitable configuration and may be made of any suitable material, such as a polymeric material or metal. The frame 24 provides a support structure for the seat back 14.

The air bag module 26 includes a housing 40, an inflator 42, and an air bag 44. The air bag module 26 may be disposed in any suitable location. In the embodiment shown in FIG. 3, the air bag module 26 is disposed proximate the frame 24.

The housing 40 is configured to receive at least a portion of the air bag 44 when the air bag 44 is deflated. The housing 40 may have any suitable configuration. In the embodiment shown, the housing 40 includes an optional frangible portion 46 that is adapted to tear or sever in response to force exerted by the air bag 44 when the air bag 44 is inflated. The housing 40 may be configured to receive the inflator 42 and the air bag 44. The housing 40 may cooperate with the frame 22 to define a slot 48 configured to receive the first coupling member 32.

The second coupling member 50 may have any suitable configuration that is compatible with the first coupling member 32. For example, the second coupling member 50 may have a male or a female configuration, or combinations thereof as will be described in detail below.

The air bag 44 is configured to expand from a stored condition to a deployed or inflated condition when the inflation gas is provided. More specifically, the air bag 44 is deflated and concealed by the housing 40 and/or back panel 28 when in the stored condition and is inflated and positioned between a seat occupant and an interior vehicle surface when in the inflated condition. The second coupling member 50 may be positioned so as not to interfere with air bag deployment.

The back panel 28 may have any suitable configuration. For example, the back panel 28 may wrap around the back and one or more sides of the seat back 14. The back panel 28 is configured to conceal the air bag module 26 prior to air bag deployment and to permit deployment of the air bag 44. The back panel 28 may be attached to the seat assembly 10 in any suitable manner, such as with hooks, fasteners, and/or an adhesive.

Referring to FIGS. 4A–4F, various exemplary embodiments of first and second coupling members are shown. In the embodiments shown in FIG. 4A–4E, the first coupling member has a male configuration and the second coupling member has a female configuration. In the embodiment shown in FIG. 4F, the first coupling member has a female configuration and the second coupling member has a male configuration.

In the exemplary embodiments, the second coupling member includes a mounting arm, designated the first arm. The first arm is adapted to be inserted into the slot 48. The first arm and slot 48 may have a interference fit or may be secured to the frame 24 and/or air bag module 26 in any suitable manner, such as with one or more fasteners or an adhesive.

Figure 4A:
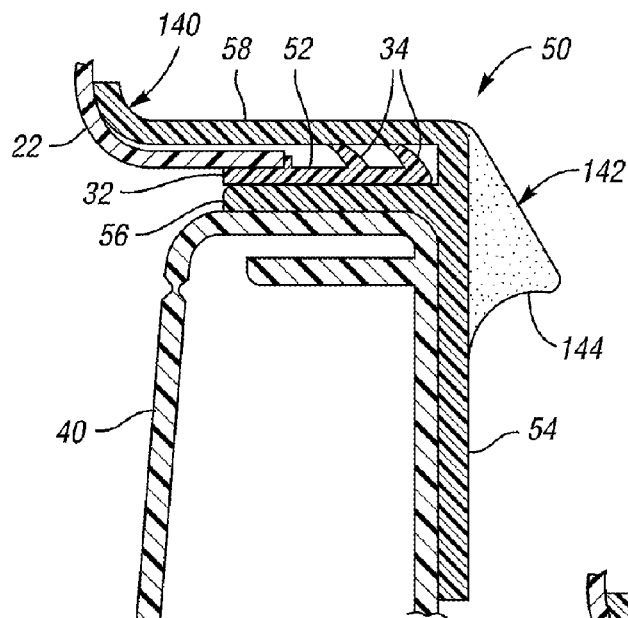
FIGS. 4A–4F are fragmentary section views of exemplary embodiments of coupling members for attaching a trim cover to the vehicle seat assembly.
Figure 4B:
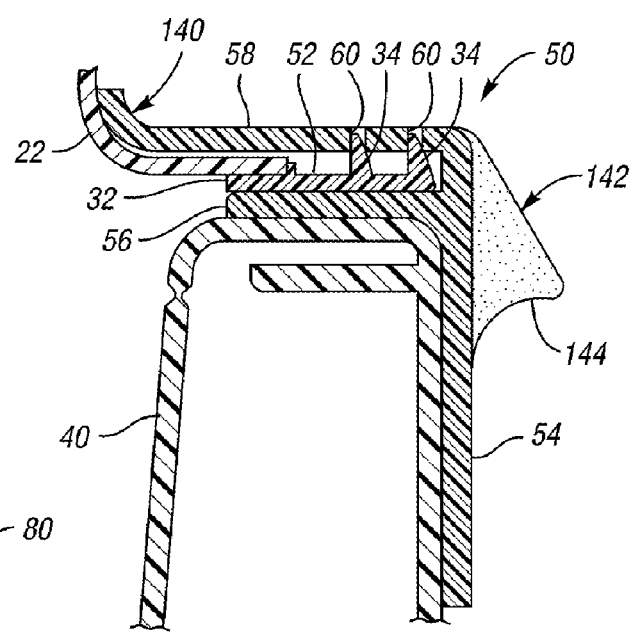

FIG. 4A is a magnified view of the first and second coupling members 32,50 shown in FIG. 3. In FIG. 4A, the first coupling member 32 includes protrusions 34 that extend from a first surface 52. The second coupling member 50 also includes first, second, and third arms 54,56,58. The second and third arms 56,58 are spaced apart and disposed on the first arm 54. The protrusions 34 extend toward and engage the second arm 56 to help secure the first and second coupling members 32,50. In addition, the protrusions 34 may be received in one or more apertures 60 as shown in FIG. 4B.

Figure 4C:
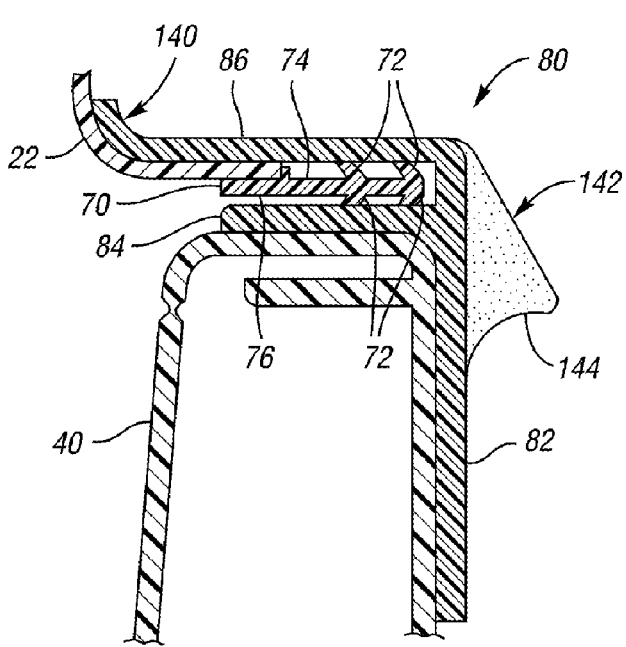
Figure 4D:
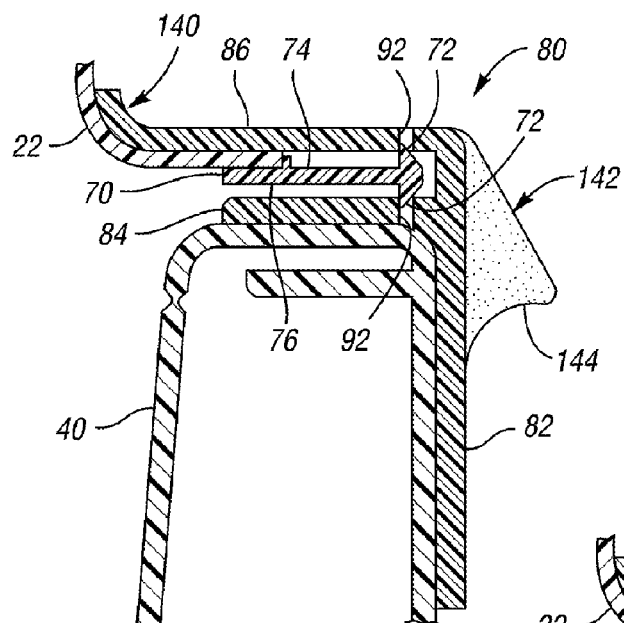

In FIG. 4C, a first coupling member 70 is shown having protrusions 72 that extend from first and second surfaces 74,76. The second coupling member 80 includes first, second, and third walls 82,84,86. The second and third arms 84,86 are spaced apart and disposed on the first arm 82. The protrusions 72 disposed on the first and second surfaces 88,90 extend toward and engage the second and third arms 84, 86, respectively. In addition, the protrusions 72 may be received in one or more apertures 92 as shown in FIG. 4D.

Figure 4E:
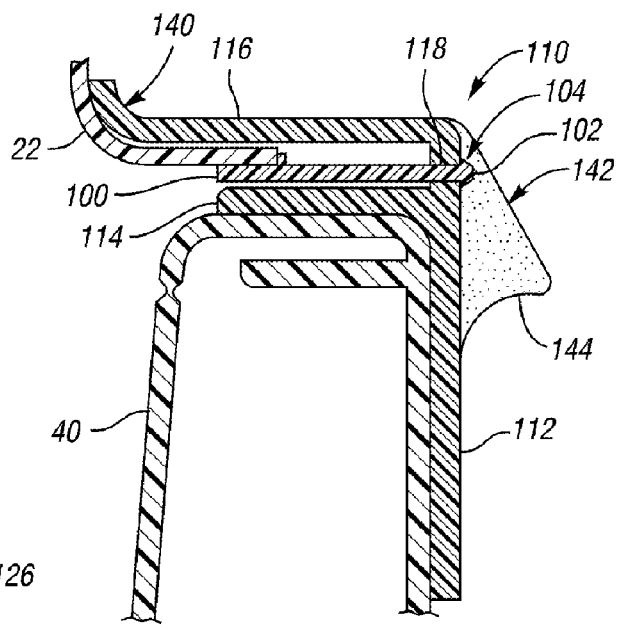

In FIG. 4E, a first coupling member 100 includes a protrusion 102 disposed proximate an end 104 disposed opposite the trim cover 22. The second coupling member 110 includes a first arm 112 and optional second and third arms 114,116. The first arm 112 includes an aperture 118 that is adapted to receive the protrusion 102. More specifically, the protrusion 102 may be inserted through the aperture 118 such that the protrusion 102 inhibits the first coupling member 100 from disengaging the second coupling member 90. The protrusion 102 may have any suitable configuration and may be adapted to flex or compress to permit the protrusion 102 to be inserted into and/or through the aperture 118.

Figure 4F:
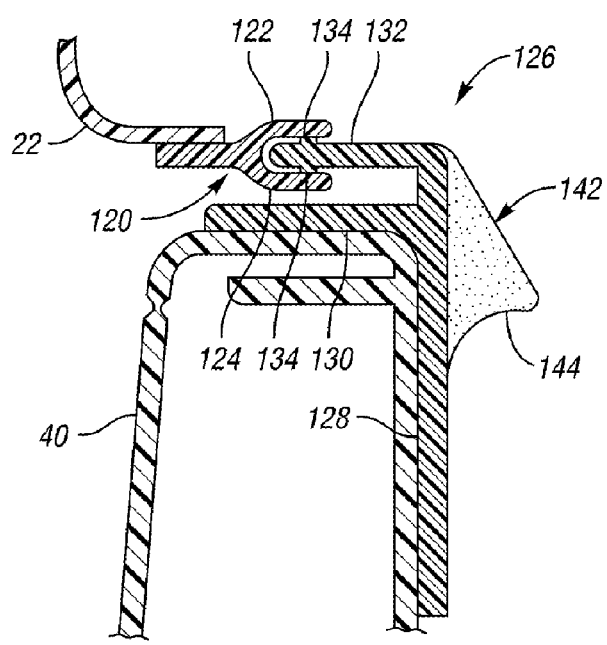

In FIG. 4F, the first coupling member 120 has first and second walls 122,124 that are adapted to engage the second coupling member 126. The first and/or second walls 122,124 may include one or more protrusions adapted to engage the second coupling member 126. In the embodiment shown, the second coupling member 126 has first, second, and third arms 128,130,132 similar to previous embodiments. The first coupling member 120 is configured to engage the third arm 132. Optionally, the second coupling member 126 may include one or more protrusions 134 that engage the first coupling member 120.

Optionally, the first coupling members 32,70,100,120 and/or third arms 58,116,132 may include a curved end portion 140. The curved end portion 140 helps guide the trim cover 22 toward the cushion 20 and prevents the third arm 58,116,132 from tearing or damaging the trim cover 22. In addition, the second coupling member 50,80,110,126 may include an optional reinforcement rib 142. The reinforcement rib 142 is adapted to provide structural support to the second coupling member 50,80,110,126. More specifically, the reinforcement rib 142 is adapted to contact and transfer force to another component of the seat assembly 10, such as the air bag module 26 and/or frame 22. The reinforcement rib 142 may include a first surface 144 that is contoured to engage the frame 24 and inhibit the second coupling member 50,80,110,126 from being further inserted into the slot 48.

The present invention permits a simplified manufacturing of a seat assembly. More specifically, a trim cover may be quickly and easily attached to the seat assembly without the need for additional fasteners, adhesives, or manufacturing steps. In addition, the present invention permits the trim cover to be reliably attached and repositioned or reinstalled to eliminate wrinkles or misalignment that may occur during assembly, thereby reducing scrap. In addition, the present invention permits the trim cover to be easily replaced if the trim cover is damaged or otherwise needs replacement.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat assembly, comprising:
    a seat cushion assembly including:
        a frame,
        a cushion disposed proximate the frame, and
        a trim cover disposed proximate the cushion, the trim cover having an end portion;
    a first coupling member disposed proximate the end portion; and
    a second coupling member having a curved reinforcement rib disposed proximate the frame, wherein the second coupling member engages the first coupling member to secure the trim cover.

2. The vehicle seat assembly of claim 1 wherein the seat cushion assembly is a seat back.

3. The vehicle seat assembly of claim 1 wherein the first coupling member has a male configuration and the second coupling member has a female configuration.

4. The vehicle seat assembly of claim 3 wherein the first coupling member includes a plurality of protrusions adapted to engage the second coupling member.

5. The vehicle seat assembly of claim 1 wherein the first coupling member has a female configuration and the second coupling member has a male configuration.

6. The vehicle seat assembly of claim 1 further comprising an air bag module disposed proximate the frame, the air bag module and the frame cooperating to define a first slot adapted to receive the second coupling member.

7. A vehicle seat assembly, comprising:
    a seat cushion assembly including:
        a frame,
        a cushion disposed proximate the frame, and
        a trim cover disposed proximate the cushion, the trim cover having an end portion;
    an air bag module disposed proximate the frame, the air bag module cooperating with the frame to define a first slot;
    a first coupling member disposed proximate the end portion; and
    a second coupling member that engages the first coupling member and having a first arm that engages the first slot.

8. The vehicle seat assembly of claim 7 wherein the second coupling member is disposed outside the air bag module.

9. The vehicle seat assembly of claim 7 wherein the second coupling member further comprises second and third arms, the second and third arms cooperating to define a second slot adapted to receive the first coupling member.

10. The vehicle seat assembly of claim 9 wherein the first coupling member further comprises a protrusion for engaging at least one of the second and third arms.

11. The vehicle seat assembly of claim 10 wherein the second arm further comprises an aperture adapted to receive the protrusion.

12. The vehicle seat assembly of claim 10 wherein the third arm further comprises an aperture adapted to receive the protrusion.

13. The vehicle seat assembly of claim 9 wherein the first coupling member further comprises a protrusion adapted to engage the third arm.

14. The vehicle seat assembly of claim 9 wherein the third arm is longer than the second arm.

15. The vehicle seat assembly of claim 9 wherein the third arm further comprises a curved end portion that extends away from the second arm.

16. The vehicle seat assembly of claim 7 wherein the first coupling member further comprises an end surface and a protrusion disposed on the end surface, and the second coupling member further comprises a center portion having an aperture adapted to receive the protrusion.

17. The vehicle seat assembly of claim 7 wherein the second coupling member further comprises a center portion and a reinforcement rib disposed proximate the center portion.

18. The vehicle seat assembly of claim 17 wherein the reinforcement rib further comprises a first surface adapted to engage the frame.

19. A vehicle seat assembly, comprising:
    a seat back having a frame, a cushion, and a trim cover disposed proximate the cushion, the cushion having an end portion;
    an air bag module having an air bag and disposed proximate the frame, the air bag module and the frame cooperating to define a first slot;
    a first coupling member attached to the end portion; and
    a second coupling member having a first arm adapted to engage the first slot, and second and third arms cooperating to define a second slot;
    wherein the first coupling member is at least partially disposed in the second slot when the first and second coupling members are engaged.

20. The vehicle seat assembly of claim 19 wherein the second coupling member inhibits the air bag from contacting the cushion when the air bag is inflated.

* * * * *